May 19, 1970   H. MOLLY   3,512,906
GEAR MACHINE

Filed April 17, 1968   8 Sheets-Sheet 1

INVENTOR:

Hans Molly

BY:
Darbo, Robertson + Vandenburgh.
Attys.

INVENTOR:
Hans Molly

BY
Darbo, Robertson Vanderburgh
attys

May 19, 1970  H. MOLLY  3,512,906

GEAR MACHINE

Filed April 17, 1968  8 Sheets-Sheet 4

INVENTOR:

Hans Molly

BY
Darbo, Robertson + Vandenburgh
attys.

May 19, 1970        H. MOLLY        3,512,906

GEAR MACHINE

Filed April 17, 1968        8 Sheets-Sheet 5

INVENTOR:

Hans Molly

BY Darbo, Robertson & Vanderburgh
attys

May 19, 1970    H. MOLLY    3,512,906
GEAR MACHINE

Filed April 17, 1968    8 Sheets-Sheet 7

INVENTOR:
Hans Molly

BY
Darby, Robertson & Vandenbergh.
attys.

INVENTOR:
Hans Molly

BY
Darbo, Robertson + Vandenbergh.
attys

United States Patent Office 3,512,906
Patented May 19, 1970

3,512,906
GEAR MACHINE
Hans Molly, 48 Dr. Eugen-Essig-Strasse,
7502 Malsch, Germany
Filed Apr. 17, 1968, Ser. No. 722,020
Claims priority, application Germany, Apr. 18, 1967,
M 73,627; Jan. 18, 1968, M 76,960
Int. Cl. F04c 5/00, 17/06, 17/10
U.S. Cl. 418—107        5 Claims

ABSTRACT OF THE DISCLOSURE

The machine is so constructed that it may alternatively be used as a fluid pump and as a fluid motor. In one embodiment a spur gear is within and engages a ring gear. The internal opening of the casing surrounding the ring gear permits some freedom of movement of the ring gear along a line connecting the centers of the two gears, while the wall of the casing defining that opening prevents movement of the ring gear at right angles to that line. In another embodiment a pair of spur gears are employed and the casing defines an internal opening at one end of the spur gears. A plate is loosely received in this opening and has a face adapted to sealingly contact the spur gears and the casing. Symmetrically positioned passageways communicate between the internal opening and tooth chambers spaced to each side of the high and low pressure areas of the pump. Thereby when the machine is operating and the gears are forced against the casing wall adjacent the low pressure area and away from the casing wall at the high pressure area, high pressure fluid from the tooth chambers adjacent the high pressure area flows through the passageways into the internal opening and from the internal opening through passageways into tooth chambers adjacent the low pressure area. The high pressure fluid in the internal opening forces the plate against the gears and casing to form a seal.

---

The invention relates to a gear machine comprising a casing, a pair of gears meshing with each other, running with their tips adjacent casing portions and forming tooth chambers. The gears are arranged in the casing to form, during operation of the machine, a high pressure chamber and a low pressure chamber. There are connections in the casing communicating with the high pressure chamber and the low pressure chamber, respectively.

A gear pump is well known wherein equalizing grooves are provided in the cylindrical surface enclosing the gears. These grooves extend from the low pressure chamber up to the high pressure chamber. By this means, the low pressure zone is caused to extend around the major portion of the periphery of the gears. The high pressure zone is limited to a relatively small angle. The radial forces exerted on the gears from the high pressure zone are counteracted by radially acting pressure areas arranged on the periphery of the gear bearing bodies and produce radial forces opposing the pressure in the high pressure chamber. By these pressure areas, the gears are pressed against the walls of the low pressure chambers.

In this prior art pump provision must be made by additional pressure areas that the high pressure zone is restricted to the desired angle. The high pressure oil tends to make the pump leak and to establish a connection between high pressure zone and low pressure zone. With this construction separate pressure areas for sealing the high pressure zone against the low pressure zone are required. The forces exerted on the gears by the high pressure have to be transmitted to the gears through the bearings. This involves considerable difficulties, in particular, if the gears are mounted in needle bearings. Finally, the forces exerted by the said pressure areas have to be always a little larger than the forces exerted on the gears from the high pressure zone. In fact, they must be in the position to overcome the latter forces and to keep the gears in sealing engagement with the walls of the gear pump casing. It should be noted that in the prior art pump, the oil pressure in the high pressure zone tends to press the gears away from each other. The pressure areas counteract this tendency.

One disadvantage of this arrangement is that the gears have to be held in sealing engagement against the action of the pressure. The high pressure tends to press the gears away from each other and to make the machine leak. Therefore, pressure forces have to be produced by additional pressure areas and have to be transmitted to the gear shafts through the bearings, whereby the clearance normally present in the machine is eliminated. Furthermore, machines of this design usually have a well defined location of low pressure chamber and high pressure chamber so that they cannot be used with arbitrary direction of rotation and high pressure connection.

An object of the invention is to provide a gear machine (pump or motor) operating at particularly high pressures.

Another object of the invention is to provide a gear machine operating with little noise.

A still further object of the invention is to provide a gear machine having high efficiency.

A more specific object of the invention is to provide a gear machine which is, to a large extent, balanced with respect to forces in axial and radial direction to achieve, on one hand, a good seal even at high pressures and, on the other hand, to have little wear.

Furthermore, it is an object of the invention to produce a gear machine wherein the bearings are subjected to only small loads.

Finally, it is an object of the invention to provide a gear machine which is simple in structure and can be manufactured easily and economically.

In accordance with the invention there is a communication between the high pressure zone and those tooth chambers which are just always separated from the low pressure connections by one tooth or a few teeth, so that the high pressure zone extends around the major portion of the periphery of the gears and the low pressure zone is restricted to a relatively small region.

In this way, the gears run substantially in the high pressure. The said connection makes sure that high pressure prevails up to closely adjacent the low pressure connection. In contrast to the prior art construction mentioned above, the high pressure zone is not restricted but the low pressure zone is. The resultant forces exerted on the gears by the oil pressure of the high pressure zone tend to hold the gears in engagement and do not tend to press them away from each other as in the prior art construction. There are no radial balancing pressure areas acting on the gear shafts. The resultant radial forces are kept small.

Advantageously, the said communication is established between first tooth chambers, just always separated from a first connection by one tooth or few teeth, and second tooth chambers just always separated from a second connection by one tooth or few teeth.

With such a symmetrical arrangement, the machine is able to operate optionally in any direction of rotation. By the high pressure, the gears are slightly shifted towards the respective low pressure side. While the teeth of the gears sealingly engage the wall of the casing on the low pressure side, a narrow slot is formed on the respective high pressure side through which the high pressure propagates from the high pressure chamber to the adjacent tooth chambers and from there to the other side nearly to the low pressure connection. On the low pressure side, however, the gears sealingly engage the walls so that no communication with the low pressure chamber can be established. By this means, automatically the major portion of the periphery of the gears—except for the restricted low pressure zone—is exposed to high pressure regardless of how the machine is operated and where the high pressure side is located.

In a gear pump having a pair of gears, which are enclosed in a central casing portion with double circular recesses, and front plates sealingly engaging both the gears and the central casing portion in axial direction, at least one of the front plates may be arranged with axial clearance within a second casing portion affixed to the central casing portion, the space between the said front plate and said second casing portion being exposed to the high pressure of the machine, pressure areas being defined in the region of the low pressure chamber and the high pressure chamber, the effective areas of which are substantially equal to those of the respective chambers and which communicate with these chambers. Thereby the effect of the low pressure and high pressure chambers on the axial forces are eliminated, as the same pressure prevails there on both sides of the front plate. The remaining area of the front plate is exposed to the high pressure, whereby the front plate is pressed to the gears and the central portion of the casing uniformly and symmetrically. It does not matter which of the two chambers is the high pressure chamber and which is the low pressure chamber.

In order to further reduce the radial forces effective on the gear bearings, one gear may be guided movably substantially in the direction of the connecting line of the gear centers and may be supported perpendicularly to said connecting line.

Under the action of the high pressure, this gear will be pressed against the other gear, on which also forces are exerted by the high pressure. Thereby, the components of these forces acting in the direction of the connecting line of the gear centers compensate each other and do not become effective as bearing forces. It has been found that the gears rolling on each other are well able to take up these forces without excessive wear. Only forces perpendicular to the connecting line of the gear centers have to be produced to take up the non-compensating force components. Thereby, a considerable reduction of the bearing forces and an increase of the useful life of the pump may be achieved even at high pressures.

Preferably the gear machine of the invention is designed as a crescent pump comprising a spur gear meshing with a hollow gear of larger diameter. The hollow gear is guided in the machine casing for limited movement in the direction of the connecting line of the gear centers. A stationary crescent body is arranged between the spur gear and the hollow gear, and the space between hollow gear and casing communicates with the high pressure zone of the machine. The low pressure connection opens in a restricted region defined by the crescent body, the hollow gear and the spur gear such that the forces exerted by the high pressure on the hollow gear and on the spur gear form an obtuse angle and partially oppose each other through the teeth of the two gears.

According to a further modification of the invention, a low pressure area may act on the periphery of the hollow gear substantially perpendicular to the connecting line of the gear centers to support the hollow gear otherwise running in the high pressure zone.

The hollow gear may be guided in the machine casing in that the inner wall of the machine casing is curved with the outer radius of the hollow gear on approximately a semicircle each about two points offset along the connecting line of the gear center and at a distance larger than the tolerance or permissible limits of the clearance-free distance of the two gears.

Several embodiments of my invention will be described hereinbelow with reference to the accompanying drawings.

Figure 4:
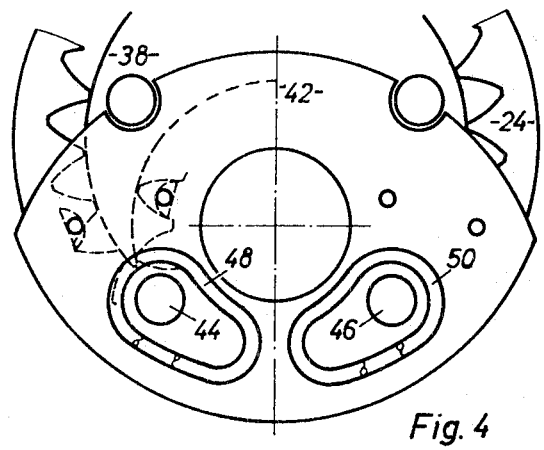
FIG. 4 illustrates the sealing of the low pressure chamber in the machine of FIGS. 1 through 3.

Reference numeral 20 designates a casing, with a chamber 22 of substantially circular shape. A hollow (or ring) gear 24 with internal teeth is mounted in this chamber 22. The hollow gear meshes with a spur gear 26. The spur gear 26 is affixed to a drive shaft 28. The drive shaft 28 is mounted in needle bearings 30 and 32 in casing 20 and a cover member 34, respectively. The cover member closes the chamber containing the gears. Casing 20 and cover member 34 are sealed to each other by a washer 36. As can best be seen from FIG. 1, a crescent body 38 is provided inside the chamber 22. This crescent body is substantially defined by the crown circle of the hollow gear 24 and the crown circle of the spur gear 26. The cover member 34 has a circular recess 40 substantially corresponding to chamber 22. A plate 42 is located in this recess. This plate covers—as can best be seen from FIG. 4—the two chambers which are defined by the spur gear 26, crescent body 38 and hollow gear 24. In the region of each of these chambers, the plate 42 has bores 44 and 46, respectively. On the outside of the plate 42 pressure areas around said bores 44 and 46, respectively, are defined by washers 48 and 50, respectively. These pressure areas communicate with the high pressure connection 52 and the low pressure connection 54, respectively. The plate 42 covers only a portion of the hollow gear 24 and the crescent body 38.

Figure 6:
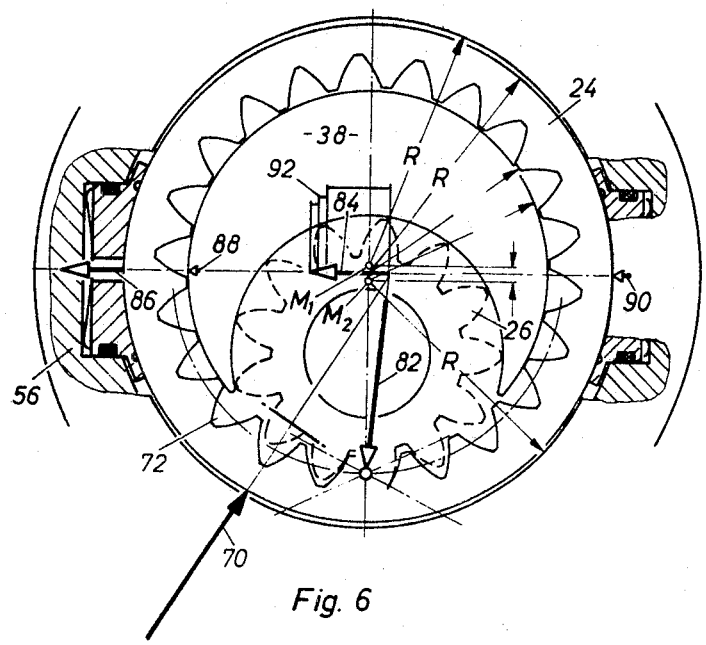
FIG. 6 illustrates the forces acting on the hollow gear.
Figure 9:
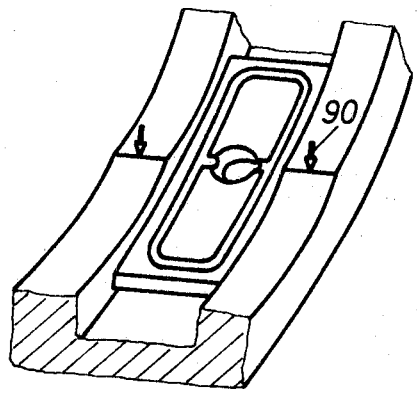
FIG. 9 is a perspective view showing that portion of the casing in which the low pressure area for supporting the hollow gear is defined.

High pressure areas or low pressure areas (depending on the rotation) are provided on the inner wall of the chamber 22 and are generally designated by 56 and 58, respectively. These pressure areas are effective at a right angle to the connecting line of the gear centers. The low pressure area 56 comprises a cylinder body 60 sealingly guided in casing 20 and having a base 62 at its inner end. A low pressure area 64 is defined on the surface of base 62 engaging the periphery of the hollow gear 24. The low pressure area 64 communicates with the low pressure connection 54 through a passage 66 and a T-bore 68. A similar arrangement is provided at 58 which operates as low pressure area, when the high pressure and low pressure connections are interchanged. The inner surface of the chamber 22 is curved on substantially a semi-circle each about two points offset along the connecting line of the gear centers. The distance of these centers of curvature is larger than the tolerance or permissible variation of the clearance-free distance of the two gears. This is shown in FIG. 6, wherein the two center points are indicated at $M_1$ and $M_2$ and the outer diameter of the hollow gear 24 is given as R. Thus an edge is produced in the region of the two pressure (low pressure) areas 56, 58, which edge is shown exaggerated in FIG. 9. During operation of the pump this edge is ground away after short time in accordance with the position and orientation of the hollow gear 24. By this construction of the chamber 22, the hollow gear is slightly movable in the direction of the connecting line of the gear centers (vertical in FIG. 1).

Figure 1:
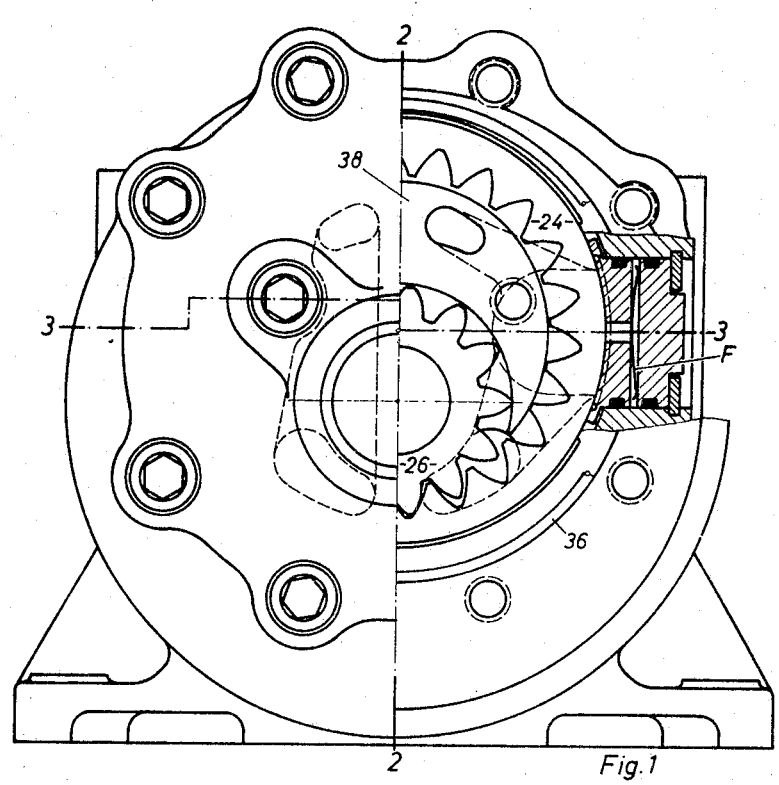
FIG. 1 is a front elevational view, partly in section, of a crescent machine designed according to my invention.
Figure 3:
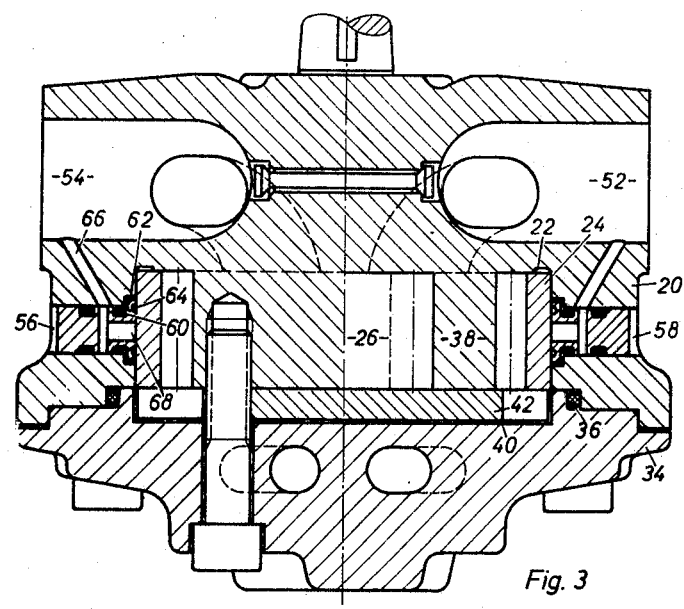
FIG. 3 is a sectional view along line 3—3 of FIG. 1.
Figure 2:
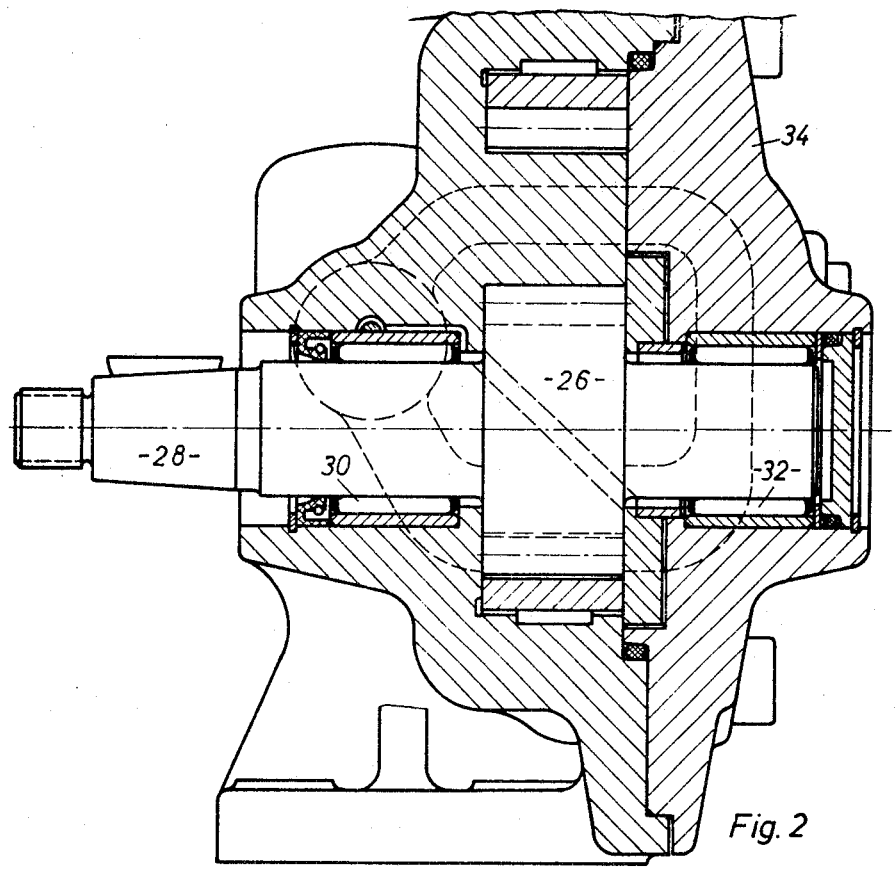
FIG. 2 is a sectional view along line 2—2 of FIG. 1.
Figure 5:
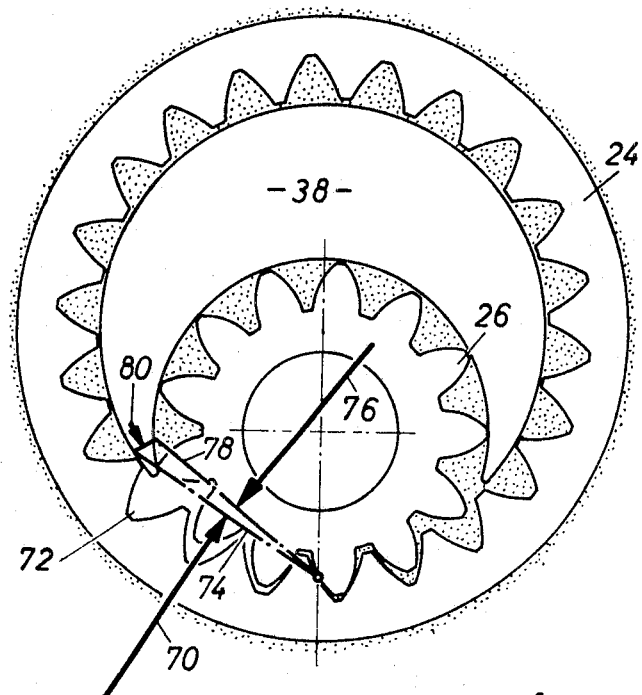
FIG. 5 illustrates the forces exerted by the oil pressure on the individual elements of the machine.

The operation of the gear machine will be described hereinbelow with reference to FIGS. 5 through 8. FIG. 5 illustrates the resultant forces exerted on the gears by the high pressure. High pressure prevails in the dotted zones. As can be seen from FIG. 5, the hollow gear is located substantially completely in the high pressure. It is completely surrounded by a high pressure zone, and, inside the hollow gear, the high pressure acts on the major portion of the circumference. The sealing of the high pressure against atmosphere is effected by the stationary casing. The high pressure acts on the hollow gear 24, on one hand, along the whole outer periphery and, on the other hand, along the major portion of the inner circumference. This is caused by the upper part of the hollow gear moving away from the crescent body 38 (as best seen in FIGS. 1 and 5) as a result of the pressure differential so that the high pressure can equalize along the major portion of the internal periphery of the gear. Thus a resultant force directed to the inside and represented by arrow 70 acts in the region of the low pressure chamber, this force being equal to the pressure difference between high pressure zone and low pressure zone times the area along the pressure chord 74 from the contact point of the hollow gear 24 on the crescent body 38 to the contact point between hollow gear 24 and spur gear 26. A force acts on the spur gear as illustrated by arrow 76. This force is directed from righthand top to lefthand bottom in FIG. 5 and approximately opposes the force 70. This force 76 is exerted by the high pressure between spur gear 26 and crescent body 38 against the low pressure chamber 72. The pressure difference acts along the pressure chord 78 from the mean contact point of the spur gear 26 and the inner surface of the crescent body 38 to the contact point between spur gear and hollow gear. A third force represented by arrow 80 acts on the crescent body 38 and thereby on the casing. This force acts along a pressure chord between the contact points of hollow gear and spur gear with the crescent body 38. Because of the mobility of the hollow gear 24 the hollow gear is held in tight engagement on the spur gear 26. Thereby, the hydraulic forces acting on the hollow gear and on the spur gear compensate to a large extent without loading the bearings of the gears.

In FIG. 6, the forces acting on the hollow gear 24 are illustrated. On one hand, there is the force 70 exerted on the hollow gear 24 from outside towards the low pressure chamber. This force 70 is counteracted by reaction forces exerted on the hollow gear by the spur gear 26 and by the casing. These reaction forces are illustrated by arrows having white points and are designated 82 and 84, respectively. As can be seen, the major portion of the force 70 is taken up by the reaction force 82 of the spur gear. Only a relatively small reaction force 84 has to be taken up by the casing. The reaction force 84 is divided into a force 86 produced by the low pressure field 56. A small residual reaction force remains effective at 88 on the crescent body 38 and provides for sealing contact of the teeth of hollow gear 24 on the crescent body. An additional relatively small reaction force becomes effective at 90 on the inner wall of the casing or the chamber 22. This reaction force at 90 causes the edge between the surfaces curved around the centers $M_2$ and $M_1$ to be ground away in accordance with the exact dimensions and the setting of the hollow gear. This dividing of the force 84 is shown at 92. At any rate, the force 70 exerted on the hollow gear by the oil high pressure is taken up, to a large extent, by the reaction force of the spur gear 26. The relatively small lateral supporting force in the embodiment shown, is taken up to a preponderant extent by the lateral low pressure area 56.

Figure 7:
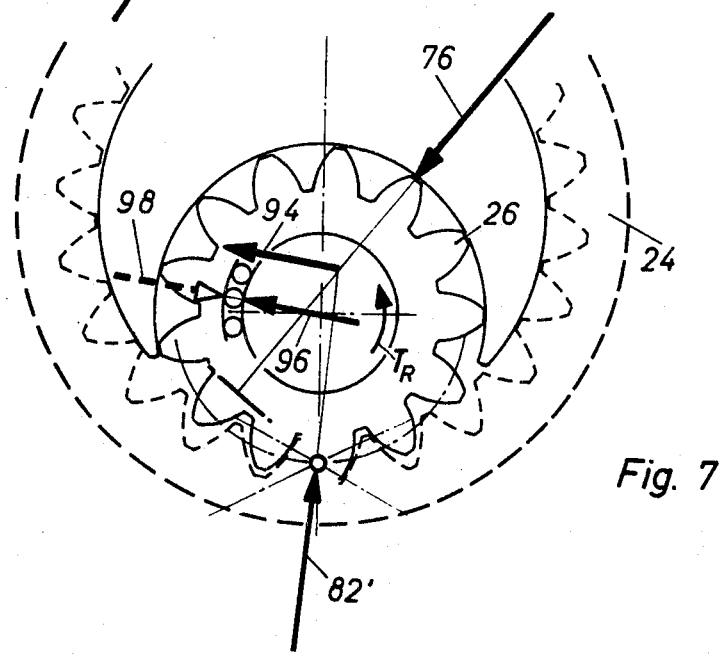
FIG. 7 illustrates the forces acting on the spur gear.
Figure 8:
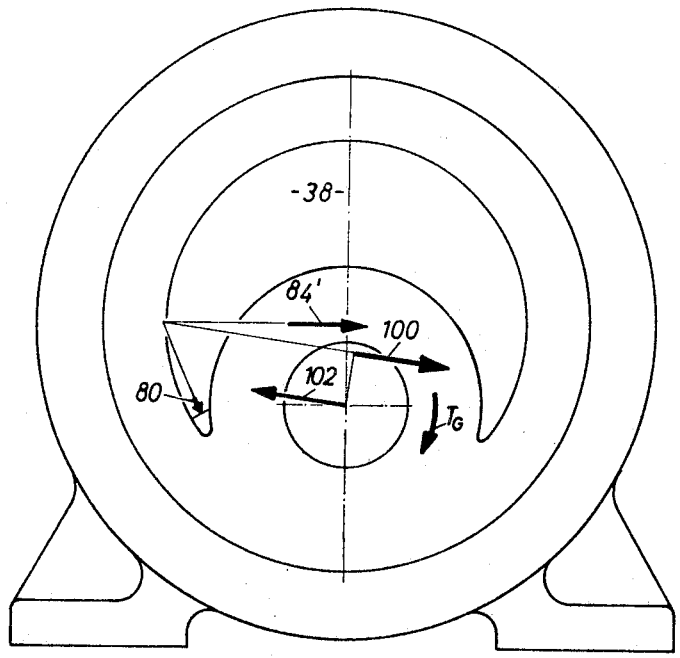
FIG. 8 illustrates the forces acting on the casing.

FIG. 7 illustrates the forces effective on the spur gear. On the spur gear, on the one hand, the force 76 from the oil high pressure acts. On the other hand, there is the force 82' transmitted to the spur gear by the hollow gear 24. The force 82' does not pass through the center of the spur gear 26. The resultant of these two forces is illustrated by arrow 94. The force 94 acting laterally from the center and pivot point of the spur gear can be resolved into a force 96 through the center of the spur gear and a torque $T_R$ acting about this center. The force 96 is taken up by the bearing, as illustrated by the arrow 98. FIG. 8 illustrates the force situation on the casing. First, a force 80 acts on the crescent body 38. In addition, the force 84' acts as reaction force for force 84 exerted on the casing by equal the resultant hollow gear. These two forces add to the force 100. This force 100 acting laterally from the pivot of spur gear 26 can be resolved into a force 102 through the pivot of the spur gear and a torque $T_G$. The force 98 is in opposition and equal to the resultant force 96 through the center of the spur gear 26 (FIG. 7), and the torque $T_G$ is equal and in opposition to the torque $T_R$. The spur gear 26, thereby, sealingly approaches the crescent body in the direction of arrow 96.

Thus, in the crescent machine described, all forces are balanced in reasonable manner to ensure that even with extreme pressures there is a proper sealing of the low pressure zone against the high pressure zone and, on the other hand, to cause only little wear. It is not necessary to seal the high pressure zone against the low pressure zone by additional pressure areas. The forces acting on the bearings may be kept relatively small as the hydraulic forces compensate to a large extent through the engaging gears. The forces can conveniently be taken up by the gears rolling on each other without undue wear.

Figure 10:
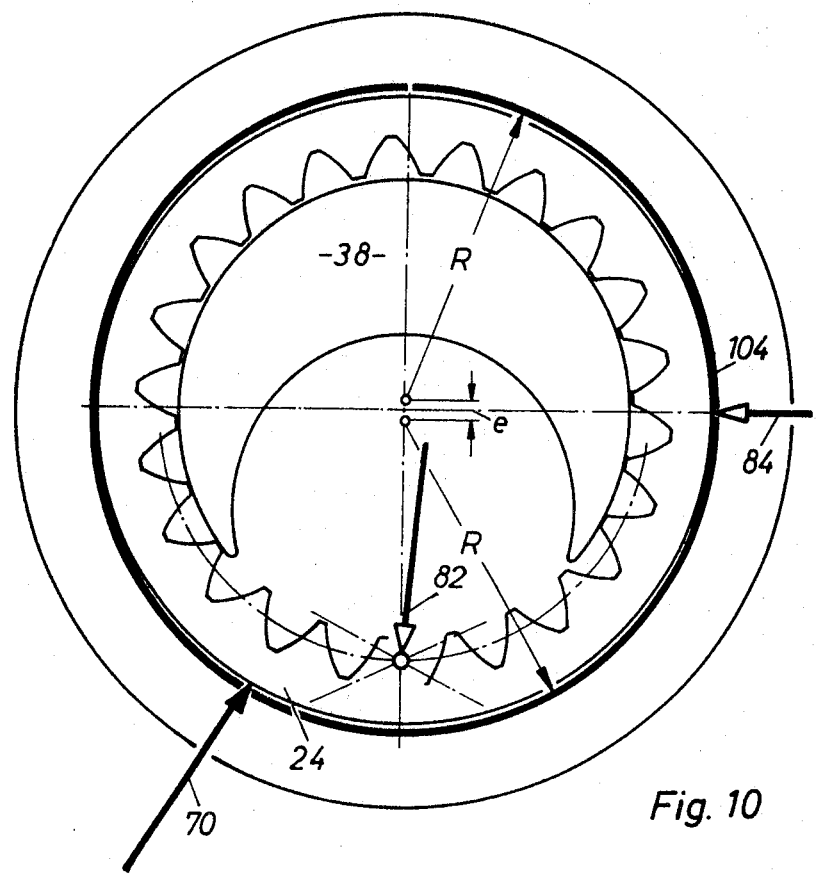
FIG. 10 shows a modified embodiment of the invention.

Though it is advantageous if the lateral supporting force on the hollow gear is taken up by a low pressure area 56, this is not a necessary condition. FIG. 10 illustrates an embodiment wherein the inner wall of chamber 22, which otherwise is shaped the same way as in FIG. 6, contains a ring consisting of sheet metal about 2 millimeters thick and coated with anti-friction metal or Teflon. In this embodiment, the lateral supporting force is produced by the casing itself. Also here, the supporting force is relatively small, as the major portion of the hydraulic force acting on the hollow gear is compensated by the reaction force of the spur gear. The hollow gear must be made correspondingly harder, in order that its teeth are not worn too much in the sealing region with the crescent.

Figure 11:
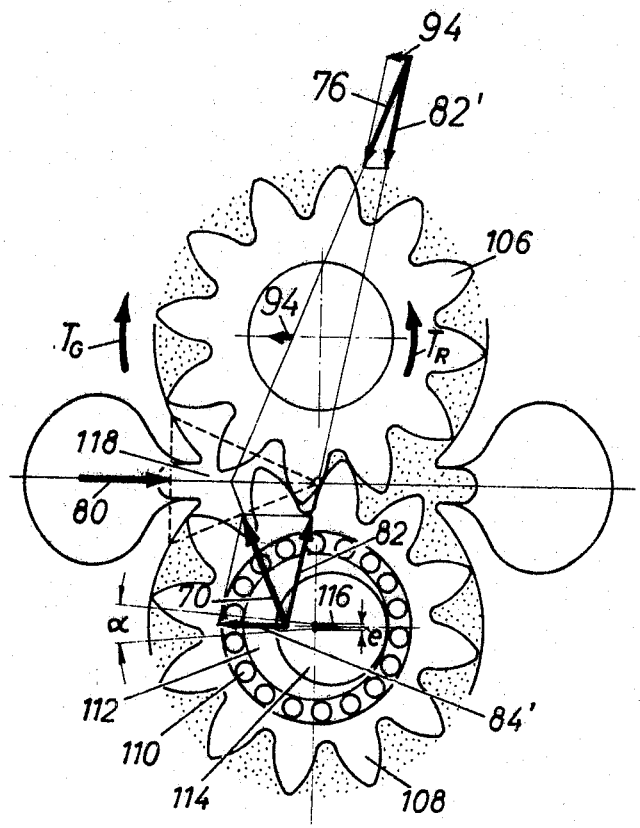
FIG. 11 shows still another embodiment of the invention.

The use of my invention is not limited to crescent pumps. FIG. 11 shows an embodiment with an ordinary gear pump having two spur gears of equal tooth numbers. In this embodiment the spur gear 108 is mounted on an eccentric 112 through a needle bearing. Eccentric 112 is supported on a pin 114. Consequently the spur gear 108 can make an orbiting movement about the center 116 of the pin 114. This is approximately a translational movement along the connecting line of the gear centers. In FIG. 11, the high pressure zone is also shown as dotted areas. As can easily be seen, the high pressure exerts forces on the spur gears 106 and 108, which forces are directed to the inside towards the low pressure chamber (undotted area) and have a relatively large component each towards the other spur gear. This component in direction of the connecting line of the gear centers presses the two spur gears 106 and 108 together, whereby these components cancel each other and do not become effective on the bearings. Thus only a supporting substantially perpendicular to this connecting line becomes necessary, which supporting is effected by the bearings. The forces have just the same meaning as in FIGS. 5 through 8 and, also here, represent mean values of fluctuating forces.

Still another embodiment is shown in FIGS. 12 through 15.

Reference numeral 121 designates a casing portion having two pipe connections 122 and 123. In addition, the casing portion 121 carries the shaft connector 124 for input or output drive connection of the machine. 126 and 125 are two generally identical gears which mesh with each other and are rotatable sealingly in a plate shaped gear casing 127. The shafts 124 and 128 are mounted in roller bearings or other bearings capable of taking up the high loads on the shafts. The shafts 124 and 128 are non-rotatably affixed to the two gears by means of keys 129. The rings 130 and 130' carrying the bearing bodies are pressed into the casing 121 and the cover member 131.

A "spectacle shaped" flat front plate 132 is located with considerable clearance under said cover member 131. With its plane surface it rests both on the gears 125 and 126 and on the gear casing 127. All three elements mentioned are machined exactly level so that no slot can be formed between any such element and the front plate 132.

For axial sealing of the gears against the chamber in which the shafts rotate, the "spectacle shaped" front plate 132 is brought into engagement by two bushings 134 provided with washers or O-rings 133. The bushings are mounted centrally to the shafts by appropriate fitting recesses and sealingly abut the bearing rings 130. The pressure prevailing in the chamber 135 between the two elements 132 and 131 shifts the bushing 134 against element 130 and causes sealing contact of the bushing there, while, at the same time, the front plate is pressed against the gears.

Oil leaking through these seals, if any, is drained through slot 136 formed between the key 129 and the gear and is directed to the low pressure side. It can be seen from FIG. 13 that, with the direction of rotation, in accordance with arrow 137 and with pump operation the gears take along oil from the low pressure chamber designated $s$ in the chambers defined by the teeth and deliver said oil at $p$ to the high pressure chamber.

Because of the displacement of the gears due to the oil pressure, the gears having a certain clearance in the roller bearings which displacement is still increased by elastic deformation of the elements, both gears will be located a little eccentric with respect to the casing. On the side $s$, there will be a sealing engagement, while on the high pressure side at $p$, there will be a gap between the gears and the bores of the casing. Even if this gap is small, it offers the possibility of a small backflow from chamber $p$ through the first two tooth crowns into a chamber, which communicates with the chamber 135 through four connecting grooves 138. Chamber 135 receives the high oil pressure and conducts it up to the region on the low pressure side of the gears, where the tooth crowns sealingly engage the gear casing 127.

Figure 12:
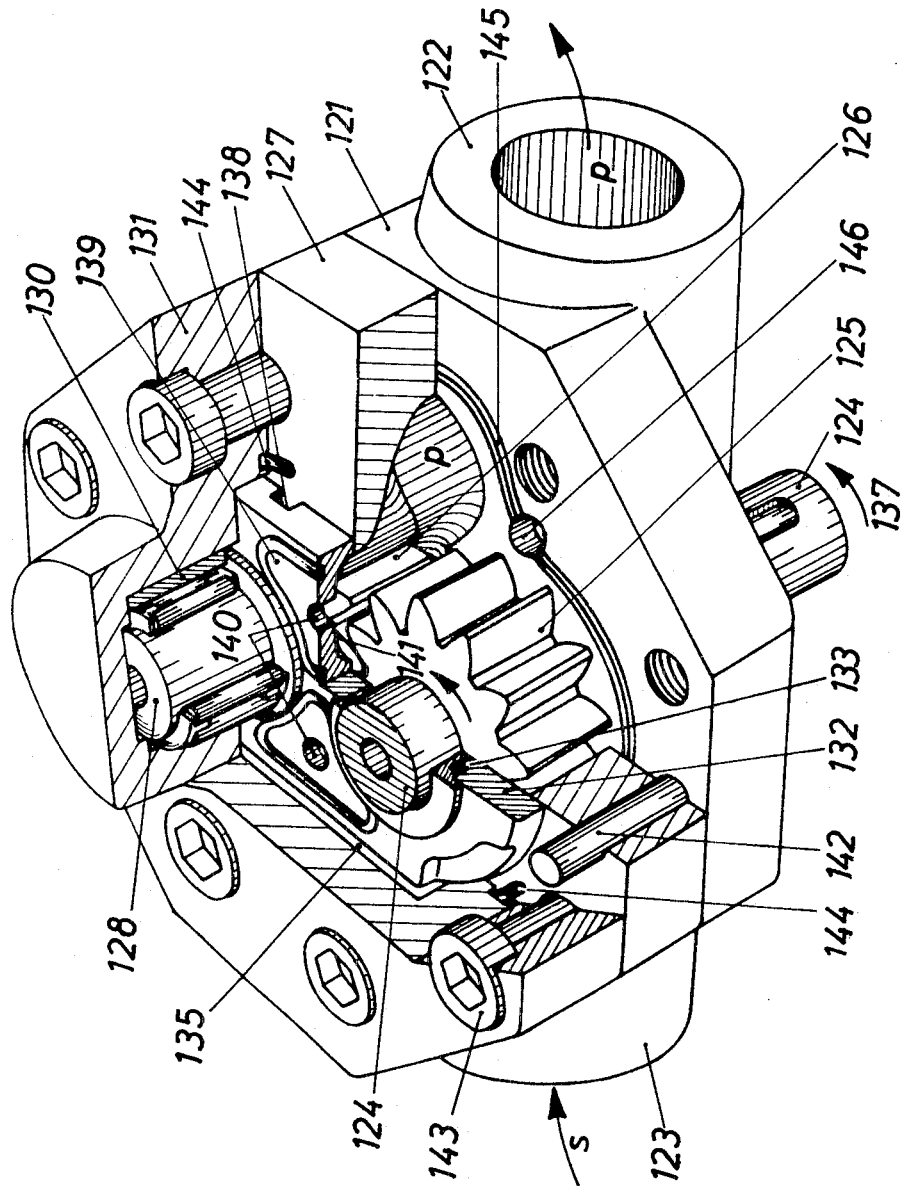
FIG. 12 is a perspective view of still another gear machine of my invention, several parts being shown broken away.
Figure 15:
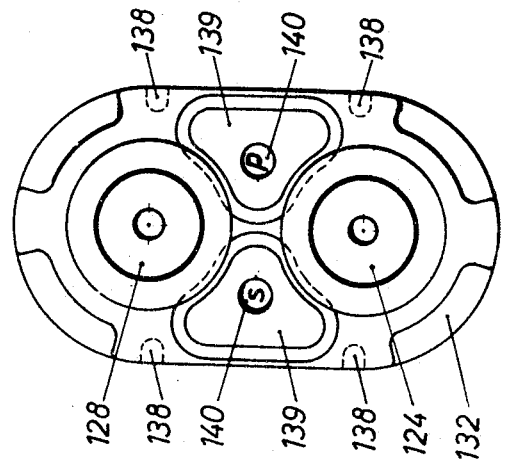
FIG. 15 is a plan view of the front plate with the pressure areas thereon.
Figure 14:
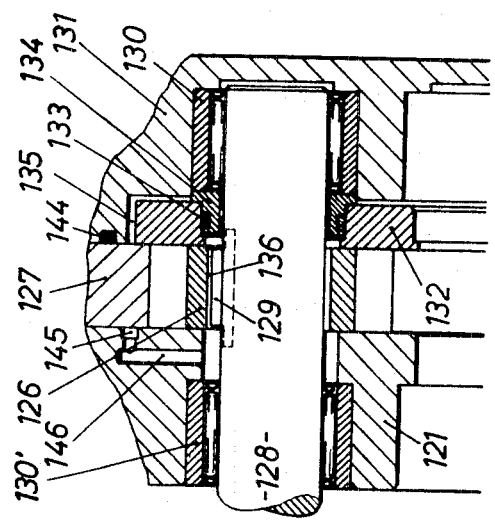
FIG. 14 is a longitudinal sectional view of the bearing of a gear.
Figure 13:
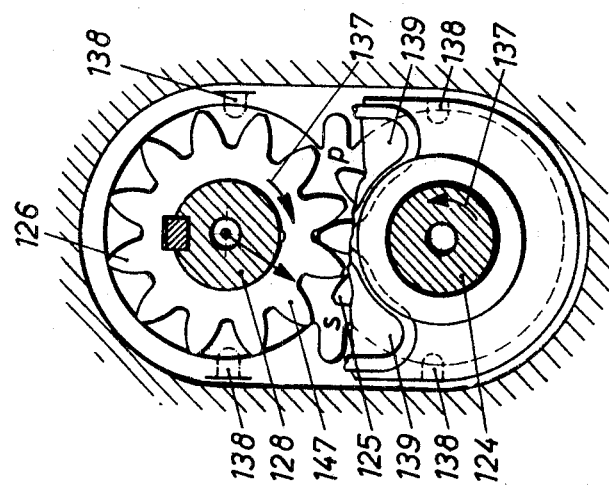
FIG. 13 is a plan view of the front plate, the latter being shown partly broken away to show the gears therebelow.

On this spot, no oil can flow back, neither axially nor radially. Because of the low pressure in chambers the end plate 132 exposed to high pressure from outside would bear against the gears with large force. In order to avoid this, an O-ring pressure area is defined on both sides in the region of the inlet and outlet chambers, this pressure area having substantially the same dimensions as the inner low pressure chamber though it is a little smaller. Thereby the pressure acting on the front plate is reduced to such an extent that no "clamping" of the gears is effected in the region of the low pressure side. To make sure that no uncontrolled pressure can occur inside the O-ring pressure area, a connection passage is bored therein to the low pressure or high pressure chamber, respectively. FIG. 12 shows the bores 140 which open into the recesses 141 of the front plate 132, which in turn make the access of oil to the tooth chambers through the front plates possible.

The front plate 132 being exposed to high pressure with its essential portions, on one side through the chamber 135 and on the other side through the tooth chambers of the two gears 125 and 126 and their high pressure chambers, has only little axial tendencies which, however, are sufficient to seal the gears relative to their shafts and the tooth chambers on the low pressure side. Thus only very small frictional losses occur in this pump and pump operates with particularly high efficiency.

The oil taken up by the gears on the low pressure side is brought after a short rotation in communication with the high pressure oil through the connection grooves 138. This high pressure oil is in the chamber 135 and is substantially enclosed here. The compression impact can, however, not propagate further, as the chamber 135 is substantially closed. Thus a corresponding calm operation of the pump or motor is achieved. The elasticity of the chamber 135 and its oil contents is sufficient to equalize the pressure in the small tooth chambers. The oil volume lost in the chamber 135 passes through the slot on the high pressure side, mentioned before, between the tooth crown and the gear casing. Its flow to the chamber 135 is so slow and free of impact that also here nearly no noise will be produced. By the symmetric design of the pressure areas 139 and the connection grooves 138, an identical operation is possible for both directions of rotation.

FIG. 12 shows how the three plate elements of the pump are assembled. Their exact positions relative to each other is given by fitting pins 142 which connect all three elements with each other in well defined relative positions. In addition, there is a circular array of bolts 143 which draw the cover element 131 against the casing 121. The gear casing 127 located between these two elements is thereby firmly clamped. An O-ring or washer 174 prevents high pressure oil from being squeezed into the clearances and leaking from the machine. By this O-ring an area is defined which tends to separate the two elements 131 and 127 from each other, with large axial force. The separating forces are transmitted to the casing 121 by the screws 143 against which the gear casing 127 bears. A groove 145 having a drain bore 146 is provided on the casing, the bore leading to a low pressure chamber in the shaft mounting. Thus this spot will be at low pressure. As the area surrounded by the groove 145 is smaller than the area defined by the O-ring with its outer diameter, an excess force is produced which becomes effective to seal the elements 121 and 127. Because of this arrangement, the casing will be sealed even if the bolts, for example, are only loosely tightened, as the forces becoming effective in axial direction from the O-ring 144 produce the sealing effect described. There would be merely a narrow clearance between the gear casing 127 and the cover member 131, which could become critical for the O-ring if the screws would be loosened too much.

Because of the narrow restriction of the low pressure chamber and the far reaching extension of the high pressure chamber, only a narrow zone for the effect of the pressure force is left, as shown by the arrow 147. Consequently, the load on the roller bearings remains small. Thus a high operating pressure may be delivered with the pump without having to fear an overloading of these bearings.

As can be seen from the symmetrical set-up of all pump or motor elements, the operation is the same for inlet and outlet in both directions of rotation and in both loading conditions. Always the effect described will be achieved. Thus the machine is suitable both as pump and motor for both directions of rotation and offers the good efficiency required for motor operation.

What is claimed is:
1. In a gear machine comprising a casing having an internal wall, a pair of gears in the casing, meshing with each other and with the gear teeth defining tooth chambers, each of said gears having a center with the gears being positioned so that the centers are spaced from each other during the operation of the machine, said casing and gears defining a high pressure area and a low pressure area, said casing having a connection communicating with the high pressure area and a connection communicating with the low pressure area, and first means for providing communication between the high pressure area and the tooth chambers up to approximately the last chamber from the low pressure area so that the high pressure extends around the major portion of the periphery of the gears and that only a relatively small portion of the periphery of the gears is exposed to the low pressure, the improvement comprising:
   said casing including second means for permitting movement of one of the gears in the direction of a line connecting said centers and for resisting movement of said one gear in a direction at right angles to said line.
2. In a machine as set forth in claim 1 of the type in which a first of the gears is a ring gear having internal teeth and the second of the gears is a spur gear within the ring gear and meshing therewith, and wherein
   said second means comprises the inner wall of said casing which has two portions curved in accordance with the outer radius of the ring gear on approximately a semi-circle each about two points offset along said line and at a distance larger than the tolerance or permissible limits of the clearance-free distance of the two gears.
3. In a machine as set forth in claim 2, wherein said two approximately semi-circular portions meet at two ridges positioned opposite to each other at substantially right angles to said line.
4. In a gear machine comprising a casing having an internal wall, a pair of gears in the casing, meshing with each other and with the gear teeth defining tooth chambers, each of said gears having a center with the gears being positioned so that the centers are spaced from each other during the operation of the machine, said casing and gears defining a high pressure area and a low pressure area, said casing having a connection communicating with the high pressure area and a connection communicating with the low pressure area, and means for providing communication between the high pressure area and the tooth chambers up to approximately the last chamber from the low pressure area so that the high pressure extends around the major portion of the periphery of the gears and that only a relatively small portion of the periphery of the gears is exposed to the low pressure, whereby the pressure differential across the gears between the high pressure area and the low pressure area forces the tips of the gear teeth adjacent the high pressure area away from the wall of the casing so that at least one of the tooth chambers adjacent the high pressure area communicates with the high pressure area and forces the tips of the gear teeth adjacent the low pressure area against the wall of the casing so that at least one of the tooth chambers adjacent the low pressure area is shut off from communication with the low pressure area, the improvement wherein said means comprises:
   at one end of said gears said casing defining an internal opening extending across said end of the gears and across a part of the internal wall surrounding the gears whereby the casing defines an abutment at said end of the internal wall surrounding the gears;
   a plate in said internal opening and having a face overlying said ends of the gears and said abutment, said plate being movably axially of the gears into a position at which said face is in sealing contact with said ends of the gears and said abutment; and
   passageways between said internal casing opening and tooth chambers which passageways are spaced to each side of the high and low pressure areas;
   whereby fluid from said high pressure area passes through a passageway from a tooth chamber adjacent the high pressure area into the internal opening to pressurize the internal opening and force said plate toward said end of the gears and abutment, and pressurized fluid from the internal opening passes through a passageway from said internal opening to a tooth chamber spaced from said low pressure area to pressurize said last mentioned tooth chamber.
5. In a machine as set forth in claim 4, wherein said gears are each spur gears and are rotatable in either direction whereby with one direction of rotation one area becomes the high pressure area and with the reverse rotation that one area becomes the low pressure area, and vice versa with the other area, and said passageways are symmetrically arranged with respect to said gears whereby with either direction of rotation said internal opening is pressurized merely by reason of the fact that the gears are forced toward the wall adjacent the low pressure area and away from the wall adjacent the high pressure area with either direction of rotation.

References Cited

UNITED STATES PATENTS

| | | |
|---|---|---|
| 2,132,813 | 10/1938 | Wahlmark. |
| 2,624,287 | 1/1953 | Ilyin. |
| 2,682,836 | 7/1954 | Orr. |
| 3,204,564 | 9/1965 | Eltze. |
| 3,233,552 | 2/1966 | Kinnavy. |
| 3,285,188 | 11/1966 | Kita. |
| 3,315,609 | 4/1967 | Eckerle. |
| 2,544,144 | 3/1951 | Ellis. |

FOREIGN PATENTS 157,744    12/1932    Switzerland.

DONLEY J. STOCKING, Primary Examiner

W. J. GOODLIN, Assistant Examiner

U.S. Cl. X.R.

418—171, 206